United States Patent
Hall et al.

(10) Patent No.: US 10,475,201 B1
(45) Date of Patent: Nov. 12, 2019

(54) METHOD AND APPARATUS FOR DETERMINING WHEEL RIM AND TIRE DIMENSIONS ON A MOVING VEHICLE

(71) Applicant: Hunter Engineering Company, St. Louis, MO (US)

(72) Inventors: Aaron C. Hall, St. Louis, MO (US); Mark S. Shylanski, University City, MO (US); Timothy A. Strege, Sunset Hills, MO (US)

(73) Assignee: Hunter Engineering Company, St. Louis, MO (US)

( * ) Notice: Subject to any disclaimer, the term of this patent is extended or adjusted under 35 U.S.C. 154(b) by 111 days.

(21) Appl. No.: 15/423,265

(22) Filed: Feb. 2, 2017

Related U.S. Application Data (60) Provisional application No. 62/290,086, filed on Feb. 2, 2016.

(51) Int. Cl.
| | |
|---|---|
| *G01B 11/24* | (2006.01) |
| *G06T 7/62* | (2017.01) |
| *G01B 11/10* | (2006.01) |
| *H04N 5/225* | (2006.01) |
| *G06T 7/13* | (2017.01) |
| *G06T 7/00* | (2017.01) |

(52) U.S. Cl.
CPC ............. *G06T 7/62* (2017.01); *G01B 11/105* (2013.01); *G06T 7/0004* (2013.01); *G06T 7/13* (2017.01); *H04N 5/2256* (2013.01); *G06T 2207/30252* (2013.01)

(58) Field of Classification Search
CPC .......... H04N 5/2256; G06T 7/62; G06T 7/13; G06T 11/105; G06T 7/0004
See application file for complete search history.

(56) References Cited

U.S. PATENT DOCUMENTS

| | | | |
|---|---|---|---|
| 4,123,023 A | 10/1978 | Nelson | |
| 4,153,131 A | 5/1979 | Sakata et al. | |
| 4,341,021 A | 7/1982 | Beissbarth | |
| 4,745,469 A | 5/1988 | Waldecker et al. | |
| 4,863,266 A | 9/1989 | Masuko et al. | |
| 4,899,218 A | 2/1990 | Waldecker et al. | |

(Continued)

FOREIGN PATENT DOCUMENTS

| | | |
|---|---|---|
| JP | 63094103 | 4/1988 |
| JP | 11120480 | 4/1999 |

(Continued)

OTHER PUBLICATIONS

Sensing Solutions—Automotive Industry, pp. 1-12, 2005, Keyence Corporation, Product Lit. No. SS05S-AUTO-KA-L-E0085-1, Japan.

(Continued)

*Primary Examiner* — Jonathan R Messmore
(74) *Attorney, Agent, or Firm* — Sandberg Phoenix & von Gontard PC (57) ABSTRACT

A vehicle inspection or measurement method and system configured to utilize non-contact optical sensors to acquire images and measurement data associated with at least one vehicle wheel assembly as a vehicle moves through a field of view, and to evaluate the acquired image and/or measurement data to determine at least one dimension associated with an observed feature of the vehicle wheel assembly.

10 Claims, 8 Drawing Sheets

(56) References Cited

U.S. PATENT DOCUMENTS

| | | | |
|---|---|---|---|
| 5,220,399 A | 6/1993 | Christian et al. | |
| 5,268,731 A | 12/1993 | Fuchiwaki et al. | |
| 5,532,816 A | 7/1996 | Spann et al. | |
| 5,600,435 A | 2/1997 | Bartko et al. | |
| 5,731,870 A | 3/1998 | Bartko et al. | |
| 5,793,492 A | 8/1998 | Vanaki | |
| 5,812,256 A | 9/1998 | Chapin et al. | |
| 5,818,574 A | 10/1998 | Jones et al. | |
| 5,978,077 A | 11/1999 | Koerner et al. | |
| 6,151,562 A | 11/2000 | Merrill | |
| 6,412,183 B1 | 7/2002 | Uno | |
| 6,545,750 B2 | 4/2003 | Roth et al. | |
| 6,559,936 B1 | 5/2003 | Colombo et al. | |
| 6,657,711 B1 | 12/2003 | Kitagawa et al. | |
| 6,748,796 B1 | 6/2004 | Van Den Bossche | |
| 6,894,771 B1 | 5/2005 | Dorrance et al. | |
| 7,177,740 B1 | 2/2007 | Guangjun et al. | |
| 7,336,350 B2 | 2/2008 | Dorrance et al. | |
| 7,454,841 B2 | 11/2008 | Burns, Jr. et al. | |
| 7,774,946 B2 | 8/2010 | Boni et al. | |
| 7,864,309 B2 | 1/2011 | De Sloovere et al. | |
| 8,107,062 B2 | 1/2012 | De Sloovere et al. | |
| 9,377,379 B2 | 6/2016 | Lee | |
| 2003/0094039 A1 | 5/2003 | Poulbot | |
| 2003/0142294 A1 | 7/2003 | Jackson et al. | |
| 2004/0095585 A1* | 5/2004 | Nayebi | B61K 9/12 356/601 |
| 2006/0090356 A1 | 5/2006 | Stieff | |
| 2006/0152711 A1 | 7/2006 | Dale, Jr. et al. | |
| 2007/0044537 A1 | 3/2007 | Knox | |
| 2007/0124949 A1 | 6/2007 | Burns, Jr. et al. | |
| 2010/0180676 A1 | 7/2010 | Braghiroli et al. | |
| 2010/0272916 A1* | 10/2010 | Falbaum | B60S 3/04 427/427.2 |
| 2011/0141345 A1* | 6/2011 | Ramsey | G02B 27/20 348/370 |
| 2013/0083009 A1* | 4/2013 | Geisner | A63F 13/02 345/419 |
| 2013/0158777 A1 | 6/2013 | Brauer et al. | |
| 2014/0063510 A1* | 3/2014 | Seifert | G01B 5/008 356/635 |
| 2014/0129076 A1 | 5/2014 | Mouchet et al. | |
| 2014/0253908 A1 | 9/2014 | Lee | |
| 2014/0310967 A1 | 10/2014 | Nagornov | |
| 2015/0059458 A1 | 3/2015 | Lee | |
| 2015/0219785 A1 | 8/2015 | Tudor et al. | |
| 2015/0243027 A1* | 8/2015 | Ichiki | G06K 9/4604 382/128 |
| 2016/0063309 A1* | 3/2016 | Konolige | G06K 9/00201 382/153 |
| 2016/0127625 A1* | 5/2016 | Hanel | G06K 9/209 348/148 |
| 2016/0282228 A1 | 9/2016 | Lee | |

FOREIGN PATENT DOCUMENTS

| | | |
|---|---|---|
| JP | 5371299 B2 | 12/2013 |
| WO | 2014134719 A1 | 9/2014 |
| WO | 2014151666 A1 | 9/2014 |

OTHER PUBLICATIONS

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, PH.D, Wheel Alignment Goes 3-D, pp. 1-5, Nov. 5, 2010, Quality Digest Magazine, www.qualitydigest.com.

X-3Dprofile—Dürr Reinvents Wheel Geometry Measurement, pp. 1-2, 2007, Dürr Assembly Products, www.durr.com.

OPTIMA Laser Distance Sensor, pp. 1-2, Mar. 2004, BS2 Multidata GmbH, www.bs-multidata.com.

SIDIS 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

Expert Solutions—Automotive Industry, pp. 1-4, 2009, Keyence Corporation, Product Lit. No. MeasureExpertAuto-KA-EN0630-E 1034-4, Japan.

* cited by examiner

METHOD AND APPARATUS FOR DETERMINING WHEEL RIM AND TIRE DIMENSIONS ON A MOVING VEHICLE

CROSS-REFERENCE TO RELATED APPLICATIONS

The present application is related to, and claims priority from, U.S. Provisional Patent Application Ser. No. 62/290,086 filed on Feb. 2, 2016, and which is herein incorporated by reference.

STATEMENT REGARDING FEDERALLY SPONSORED RESEARCH

Not Applicable.

BACKGROUND OF THE INVENTION

The present application is related to a vehicle inspection or measurement system configured to utilize non-contact optical sensors to acquire images and measurement data associated with a vehicle wheel assembly mounted on a vehicle moving through a field of view, and in particular, to methods for measuring dimensions of observed wheel assembly components from the acquired images and measurement data.

Vehicle wheel alignment systems have utilized a variety of techniques for non-contact measurement of stationary vehicle wheel assembly parameters, from which vehicle wheel alignment angles can be determined. For example, by utilizing multiple displacement measurement sensors, distances between known sensor locations and locations on a stationary vehicle wheel assembly can be measured. Processing the acquired measurements from displacement sensors observing wheel assemblies on opposite sides of an axle can identify planes parallel to the wheel assembly surfaces, from which representations of total toe and camber angles can be determined. In other configurations, two-dimensional images of a stationary vehicle wheel assembly are acquired, and image processing algorithms utilized to identify geometric features such as the wheel rim edge, from which a perspective analysis can be performed to determine estimates of vehicle wheel assembly spatial position and orientation. Alternatively, structured light patterns, such as multiple laser lines, or colored stripes, are projected onto the stationary wheel assembly surfaces and observed by an imaging system. Deviations in the projected pattern are analyzed to generate representations of the illuminated surfaces, from which the vehicle wheel assembly spatial position and orientation is estimated. In general, these systems require the vehicle to remain stationary relative to the sensors during the measurement acquisition procedure, but some non-contact measurement systems require either the wheel assembly or the sensors be rotated about a fixed axis of rotation during the measurement acquisition procedure.

Few non-contact measurement systems can acquire measurements as a vehicle wheel assembly is both rotated and translated past the sensors, i.e., as the vehicle on which it is mounted is rolled or driven past the sensors. For example, laser displacement sensors can be used to measure a distance between a fixed sensor and various points on vehicle wheel assemblies on opposite sides of a vehicle as the vehicle is driven at a slow speed between a pair of sensors. The system acquires measurement data along horizontal slices of the individual wheel assemblies, from which approximations of the wheel spatial orientations can be derived. Laser displacement systems are highly influenced by the speed at which the vehicle travels between the sensors, the angle (straightness) of vehicle travel relative to the sensor observation axis, suspension movement, and any changes in steering of the vehicle as it passes between sensors. Measurements acquired from a moving vehicle are useful to provide a vehicle service quick check or audit inspection, capable of identifying vehicles which may be in need of a further, more precise, alignment inspection and/or adjustment.

In order to fully evaluate the needs of a vehicle during a quick check or audit inspection, it is beneficial to identify the vehicle by make, model, year, installed options, or other identifying features in order to create a vehicle inspection record, retrieve the appropriate vehicle specifications, or identify outstanding recalls, etc. from a database. If a need for tire replacement is noted, such as by acquiring measurements of tire tread depth as the vehicle moves through the quick check or audit inspection system, it would be beneficial to determine dimensions of the individual wheel assemblies installed on the vehicle, consisting of rims and tires, in order to recommend a suitable replacement tire having a size which matches the tires currently installed on the vehicle. Identification of wheel assembly dimensions can further aid in identifying a specific manufacturer trim level associated with the vehicle which may not otherwise be identifiable from a decoded VIN number.

Accordingly, it would be advantageous to provide a vehicle quick check or audit inspection system, which acquires measurement data and images from a vehicle moving through an inspection lane, with the ability to determine dimensions associated with the wheel assemblies of the vehicle as it moves past a sensor field of view. It would be further advantageous to provide a vehicle quick check or audit inspection system with the capability of identifying wheel rim bead seat diameters for individual wheel assemblies of a passing vehicle, of identifying tire sizes for tires installed on individual wheel assemblies of a passing vehicle, and/or the capability of utilizing vehicle wheel assembly dimensions to identify a manufacturer trim level of a passing vehicle.

BRIEF SUMMARY OF THE INVENTION

Briefly stated, the present disclosure sets forth a vehicle inspection or measurement system configured to utilize non-contact optical sensors to acquire images and measurement data associated with at least one vehicle wheel assembly mounted to a vehicle moving through a field of view, and to evaluate the acquired image and/or measurement data to determine at least one dimension associated with an observed vehicle wheel assembly.

In one embodiment, the vehicle inspection or measurement system is configured with a plurality of laser displacement sensors to acquire displacement measurements associated with a vehicle passing through a field of view, and in particular, with at least one wheel assembly on the vehicle. The system is configured with a processor and operating instructions to observe optical properties of displacement sensor laser light reflected from illuminated points on the passing vehicle at a plurality of different vertical elevations. The system identifies transitions points between surfaces, such as tire sidewall surfaces and wheel rim edges, based on changes in the observed optical properties of the reflected laser light as the vehicle moves through the projected laser beams. Utilizing the identified transition points, together with a known vertical spacing of the plurality of reflected laser beams, various lateral chord dimensions across the face of the passing wheel assembly rim are determined and evaluated by the vehicle inspection or measurement system, establishing a measure of the wheel rim outer diameter. Related measurements, such as the wheel rim bead seat and wheel rim radius are optionally determined by the vehicle inspection or measurement system from the identified wheel rim outer diameter.

In a further embodiment, a vehicle inspection or measurement system is configured with at least one optical imaging sensor capable of capturing a generally orthogonal image of a vehicle wheel assembly within a field of view while the vehicle wheel assembly is illuminated by a plurality of laser dots projected from an array of laser emitters at known relative positions and orientations. The vehicle inspection or measurement system is configured with a processor and operating instructions to evaluate the captured image to identify illuminated points of reflected laser light together with a circumferential feature corresponding to an edge of the vehicle wheel assembly rim. With the identified rim edge, which may appear in an acquired image to be elliptical, and not a perfect circle, the vehicle inspection or measurement system determines an apparent size, in image pixels, of a major axis of the rim edge circumference. Similar evaluations are carried out to determine the relative spacing in image pixels corresponding to the identified illuminated points of reflected laser light arranged in the known spatial array, from which a scaling between an image pixel distance and a physical distance is determined. The vehicle inspection or measurement system applies the scaling to the apparent size of the rim edge major axis as measured in image pixels, identifying an actual diameter measurement of the wheel rim edge as a physical distance. Related measurements, such as the wheel rim bead seat and wheel rim radius are optionally established by the vehicle inspection or measurement system from the identified wheel rim outer diameter.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Since the present application describes features which exist on opposite lateral sides of a vehicle inspection lane, but which are otherwise identical, it will be understood that the use of the reference designations Left and Right, or L and R as in the Figures, identify corresponding components utilized at locations relative the left and right lateral sides of a vehicle or vehicle inspection lane. For example, a sensor unit described generically as 150 will be designated as 150R and 150L when specifically shown or described at either the right or left side of the vehicle inspection lane 10 as seen in FIG. 1.

Figure 1:
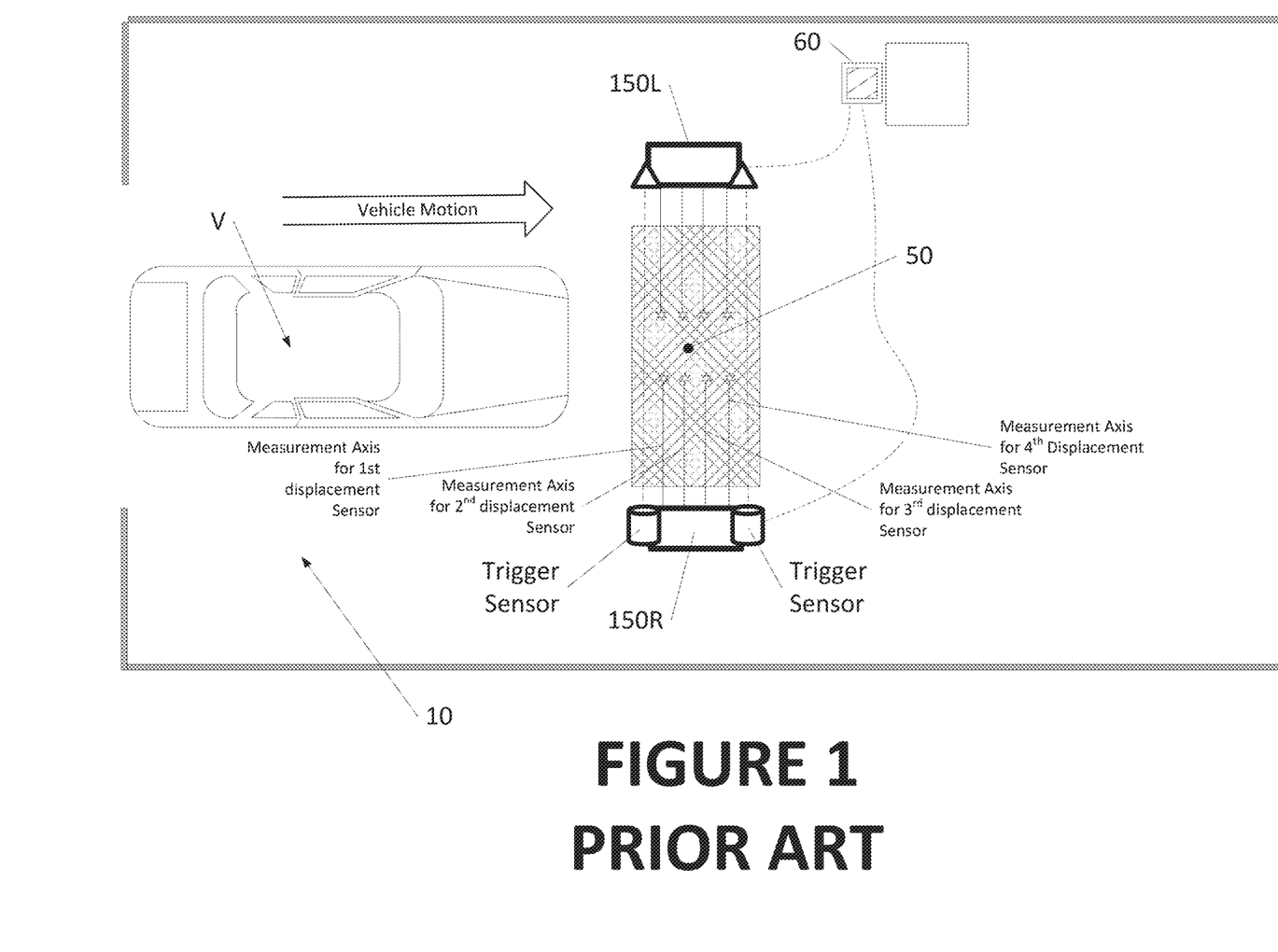
FIG. 1 is a top plan view of a prior art vehicle inspection lane, illustrating an exemplary configuration and placement location for sensor units in a drive-through configuration.

A vehicle measurement system such as shown in FIG. 1 is generally intended for use in a vehicle service shop drive-through configuration, where a moving vehicle V is driven through a sensing region 50 within the vehicle service or inspection lane 10, in a generally straight line (but not necessarily along, or parallel to, a longitudinal midline of the vehicle service or inspection lane 10), While driven, the vehicle is observed by various sensor units 150 acquiring measurement data, and optionally, acquiring vehicle-associated still-frame or motion video images.

The array of sensors provides an operator with an initial diagnostic overview of the moving vehicle V with minimal operator interaction, and may include displacement sensors 200 for acquiring data related to vehicle wheel alignment, drive-over tire tread depth sensors for measuring tire wear conditions (not shown), and drive-over tire pressure measurement sensors for measuring tire inflation conditions (not shown). Machine vision systems (not shown) may be included for recording vehicle body panels for damage or misalignment, for observing tire sidewall markings to identify tire parameters, and/or for capturing vehicle identifying information such as license plate data. Depending upon the configuration of the various sensors observing the vehicle V as it moves through the sensing region 50, an operator may be provided, at an operator console 60, with a detailed report on the condition of multiple components of the vehicle V, recalled vehicle and customer records, and recommended service and replacement parts without the need to manually identify, record, or retrieve any data.

In an exemplary configuration, one or more sensor assemblies or units 150, each containing at least one displacement sensor system 200, are disposed on each lateral side of the sensing region 50 to observe the opposite sides of the vehicle V moving through the sensing region 50. Each displacement sensor system 200 is associated with an operational range or field of view within which the displacement sensor system 200 is capable of measuring, to within a desired tolerance, a distance to an observed surface. Given the wide variation in configurations of vehicles V, each displacement sensor system 200 is preferably disposed such that the observed surfaces for each side of an intended collection of vehicle configurations will pass through the associated operational ranges or fields of view. Data from the displacement sensor systems 200 is conveyed to a processing system (local or remote) configured with suitable software instructions to control and/or communicate with the various displacement sensor systems, receive data therefrom, analyze the received data, receive operator input such as laser settings, camera settings, or processing algorithm selections, and to convey resulting measurements to an output or data storage system. The operator input and output may be conveyed through a suitably configured operator console 60, or communicated via a suitable communications network to a remote device such as a tablet, cell phone, or workstation (not shown).

Each sensor unit 150 consists of a support framework configured as necessary to mount at least one displacement sensor system 200, or preferably, two or more laterally spaced displacement sensor systems 200, such that an operative field of view for each displacement sensor system 200 encompasses observable lateral side surfaces associated with a range of measurable vehicles V traversing the sensing region 50 of the inspection lane 10. Displacement sensors systems 200 preferably consists of a set of laser displacement sensors, but those of ordinary skill in the art will recognize that other types of displacement sensors, including 2D imaging, time-of-flight optical sensors, and ultrasonic sensors capable of obtaining displacement measurements to surfaces within a field of view may be utilized. Provisions may be included within each sensor unit 150 for additional other types of sensors associated with a vehicle inspection system.

Within a sensor unit 150 containing multiple displacement sensor systems 200, a lateral spacing between the displacement sensor systems 200, as well as an associated vertical position of each, may be either random or determined, with each displacement sensor system 200 functioning as an independent measurement sensor to contribute measurement data to a collection of displacement measurements associated with a vehicle V passing through the inspection lane 10. Displacement measurement data acquired from multiple points or locations on the surfaces of a passing vehicle V, such as from individual wheel assemblies 104, as the vehicle moves through the sensing region 50 of the inspection lane 10 is utilized by the suitably configured processing system to establish average displacement measurements associated with select features on the vehicle, to discard outlier displacement measurements using tolerance ranges or other statistical analysis techniques, and/or to detect and identify changes in vehicle velocity (braking or accelerating), oscillations in the vehicle suspension (such as from driving over a raised lip or recessed drain in the inspection lane floor surface), and/or steering changes as the vehicle V passes through the vehicle inspection lane 10.

Figure 2:
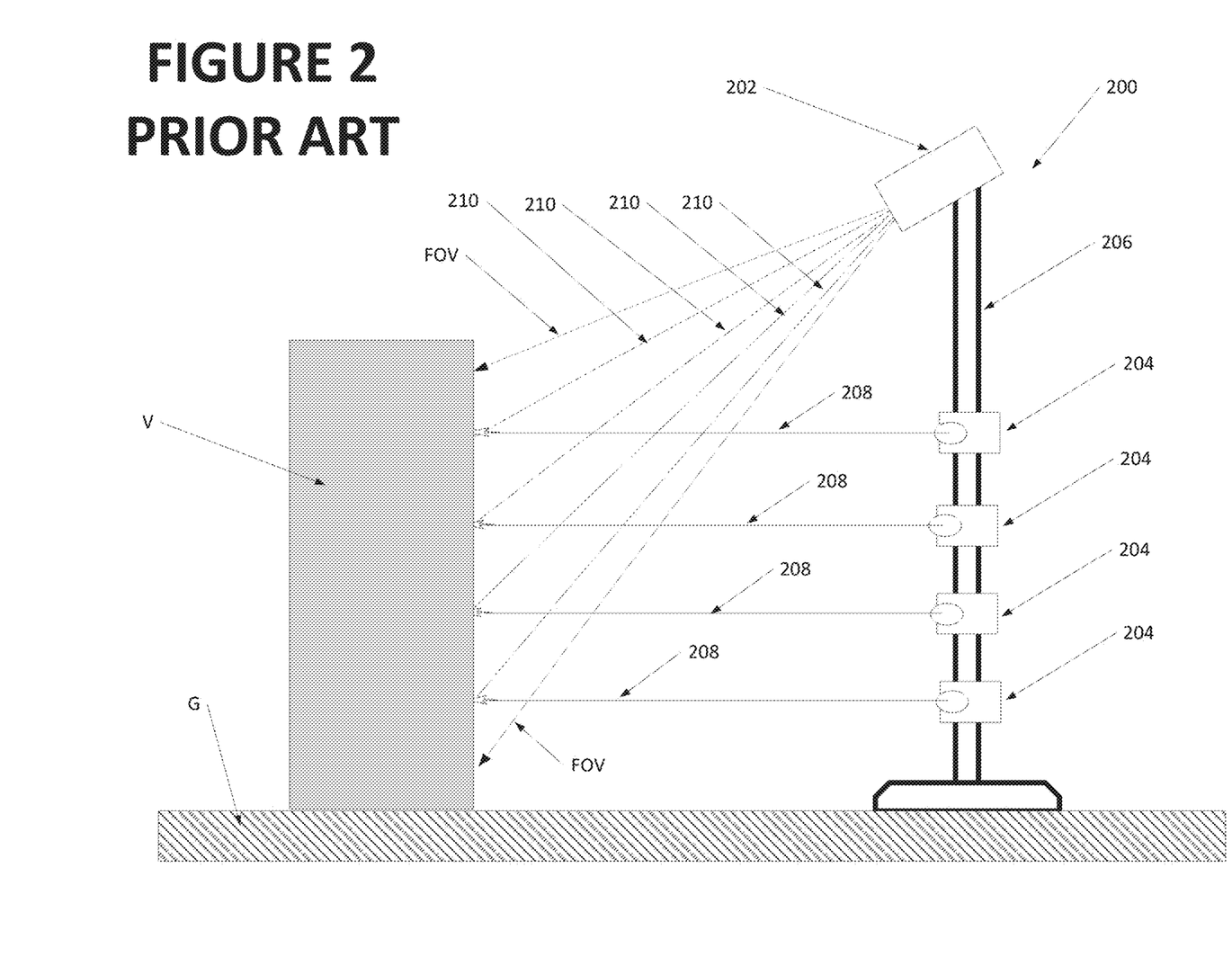
FIG. 2 is a side view of a prior art multiple-laser displacement sensor system within a sensor unit such as shown in FIG. 1.

A laser displacement sensor system 200 such as shown in FIG. 2, consists of an imaging sensor 202 having a field of view FOV to receive reflected light from a surface illuminated by two or more associated laser emitter 204 or other associated light sources aligned in a vertically spaced arrangement on a support stand 206, in a fixed relationship with the imaging sensor 202. The known or determinable vertical spacing between each laser emitter 204 may be uniform, varied, or symmetric. Each laser emitter 204 is configured to project a laser beam 208, preferably parallel to the ground G or vehicle support surface, onto surfaces of the vehicle V passing through the field of view FOV of the associated imaging sensor 202, such that reflected laser light 210 from the surfaces is received on a pixel array 205 of the associated imaging sensor 202 after passing through an appropriate focusing lens or optical system. Additional laser emitters 204 may be utilized to project a plurality of parallel laser beams (for example, defining a grid of illuminated points on the surface of an observed object) which are subsequently reflected onto the pixel array 205 of the associated imaging sensor 202.

Figure 3:
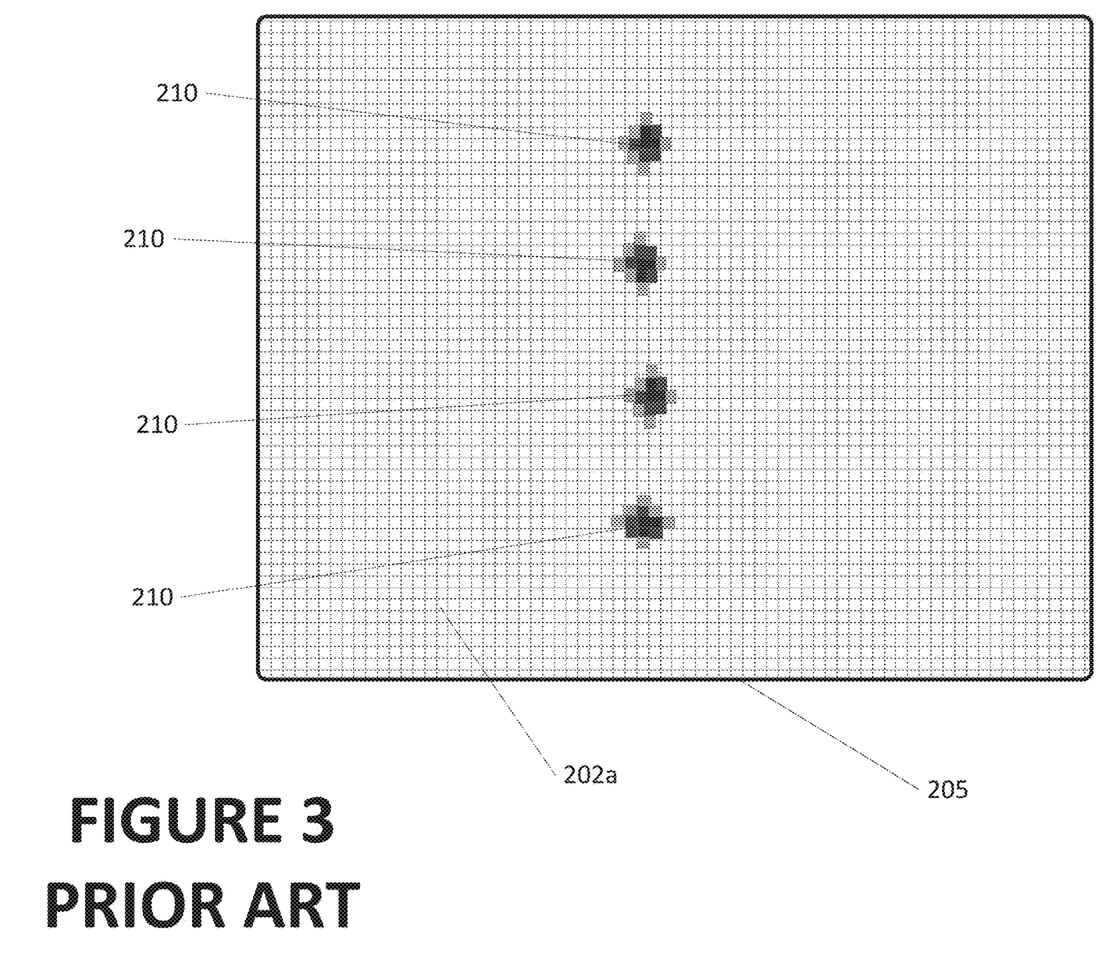
FIG. 3 illustrates an exemplary imaging sensor pixel array of a prior art displacement sensor system such as shown in FIG. 2, with pixels illuminated by reflected laser light from an associated array of lasers.

Within an imaging sensor 202, a distribution and observed characteristics of the reflected laser light 210 received at a pixel array 205 of the imaging sensor corresponds at least partially with the characteristics of the surface from which the laser beams 208 are reflected. As seen in FIG. 3, Spatial locations of the illuminated pixels 202a (individual light sensing elements) along at least one dimension (i.e., a single axis) of the pixel array 205 which receives the reflected light are used to determine the precise linear displacement of the point from which the laser beams 208 were reflected, relative to the light sensing pixel array 205, preferably to a sub-pixel resolution. As the displacement to the observed surface changes along a single axis relative to the stationary pixel array 205 due to movement of the vehicle V, corresponding changes occur in the incident location of the reflected laser light 210 along at least the one dimension (the single axis) of the light sensing pixel array 205. Through image processing, distribution and characteristics of the observed reflected laser light 210 may be used, together with known parameters of the displacement sensor system 200, to triangulate at discrete points in time, the relative spatial location of the specific points of reflection on a surface of the moving vehicle V within the field of view FOV and sensing region 50.

During operation, the laser beams 208 from the individual displacement sensor systems 200 project points of light onto the various surfaces of the vehicle V as the vehicle traverses past the stationary displacement sensor systems 200. Movement of the vehicle V causes the incident points of the stationary laser beams 208 to traverse along contours of the various vehicle surfaces. Positional changes of the reflected laser light 210 received at the light-sensing pixel arrays 205 of each displacement sensor system 200 are analyzed by a controller or processor to provide displacement measurement values associated with the distance between the individual points of reflection from the vehicle surfaces and the displacement sensor system 200, generating a set of data points representing contour plots corresponding to the surfaces of the vehicle V along the measurement axis of each of the laser emitters 204, defined by the individual laser beams 208, such as shown in FIG. 2.

Observed changes in laser spot intensity or laser spot size in each light-sensing pixel array 205 may optionally be analyzed to identify characteristics of the reflecting surface, such as material type, reflectivity, or transparency. The established relationship of the substantially parallel laser beams 208 to each other, i.e., horizontally displaced, vertically displaced, or both horizontally and vertically displaced relative to a reference plane, such as the ground G or vehicle support surface, compared with the observed positions of the reflected laser spots 210 on the light-sensing pixel array 205 provide additional information about the illuminated surfaces. This additional information may include, but is not limited to, an angular orientation between the observed surface and the ground G (such as a camber angle), or the motion of the observed surface relative to the ground G (i.e., vehicle speed).

Each displacement sensor system 200 within a sensor unit 150 acquires displacement measurements associated with an observed set of spaced illuminated points or locations on the side surfaces of a passing vehicle V. A collection of displacement measurements from multiple points or locations on the side surfaces of a passing vehicle V is evaluated using a variety of techniques to obtain average measurements, to discard outlier measurements which exceed a selected tolerance or which show other statistical deviations, and optionally to detect and identify characteristics of vehicle movement which might influence the measurements. Such characteristics of vehicle movement may include, but are not limited to, changes in vehicle velocity (braking or accelerating), oscillations in the vehicle suspension (such as from driving over elevation changes in an inspection lane floor surface), and steering changes as the vehicle V passes through the sensing region 50 in the vehicle inspection lane 10. Additional factors which may influence acquired measurements include, but are not limited to, wheel assembly runout, tire sidewall raised letter or features, and tire sidewall non-uniformity.

As noted above, analysis of observed changes in laser spot intensity or laser spot size in the light-sensing pixel array 205 identifies characteristics of the reflecting surface, such as material type, reflectivity, or transparency, enabling the system to identify the point at which each projected laser spot transitions from a vehicle body panel, to empty wheel well space, to a rubber sidewall surface of a tire WT, and finally onto a metal edge of the associated wheel rim WR (and back again) as the vehicle V passes through the sensing region 50 in the vehicle inspection lane 10. This may be done by noting identified peak bulge points for leading and trailing sidewall surfaces of the tire WT along each illuminated contour $C_n$, and evaluating adjacent data points to identify leading and trailing intensity peaks indicative of the points in time where the laser spot transitions onto the surface of the tire WT, and when the laser spot transitions from the sidewall surface of the tire WT onto the metallic surface of the wheel rim WR. With a sensor assembly or unit 150 containing four laterally spaced displacement sensor systems 200 such as shown in FIG. 2, a total of 16 laser spots are projected onto the vehicle surfaces and may be monitored for the various transition points.

Figure 4:
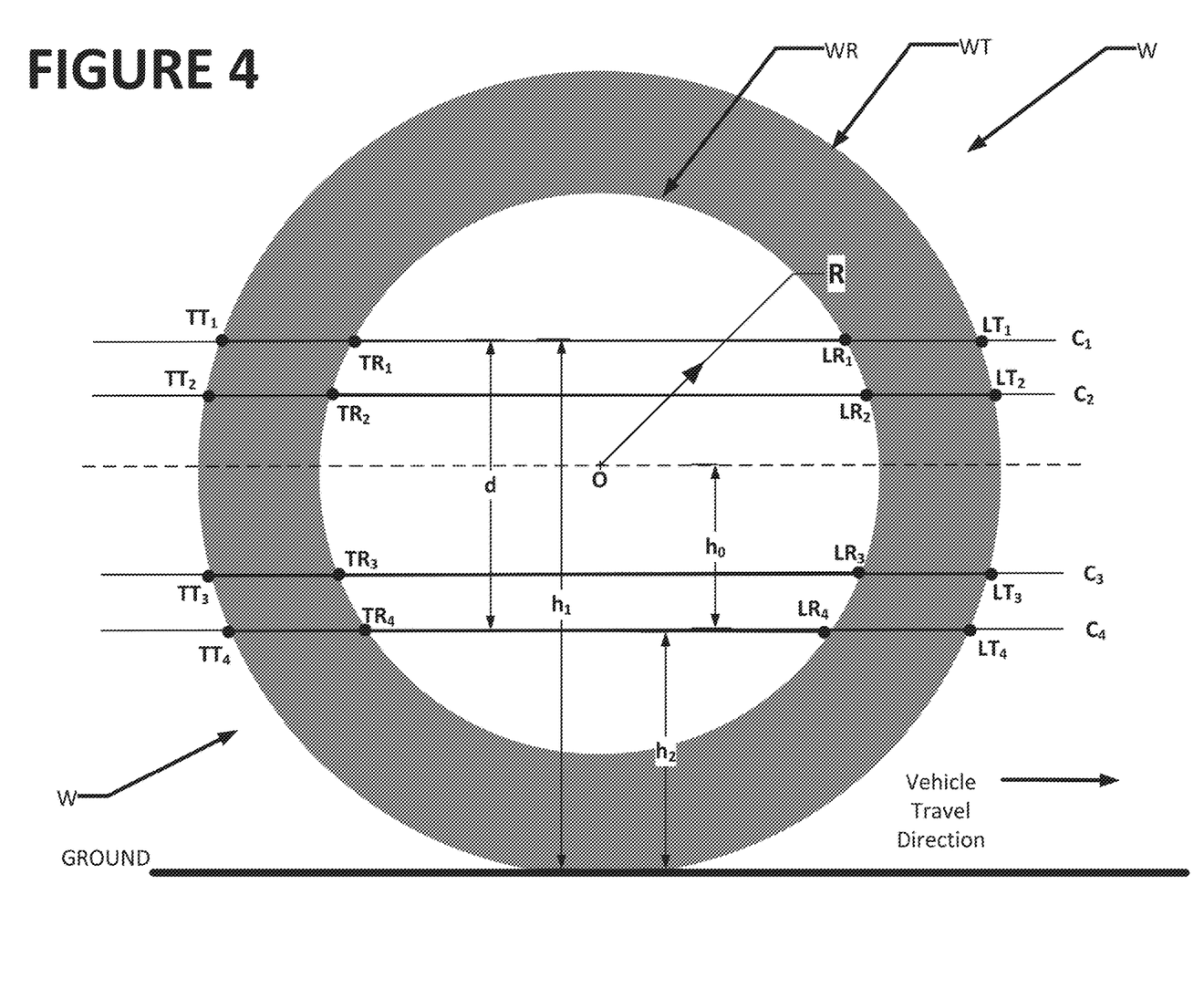
FIG. 4 is a diagrammatic representation of a vehicle wheel assembly, illustrating various measurement points defined by the wheel geometry, the tire geometry, and the stripes illuminated by laser dots as the wheel assembly moves past a non-contact measurement system.

Assuming each displacement sensor system 200 is configured to project associated laser spots at the same four vertical elevations (but laterally spaced apart), there is the potential for four laser spots to traverse the vehicle wheel assembly at each vertical elevation of the illuminated contours, such as shown at $C_1$-$C_4$ in FIG. 4. This provides a total of 16 distinct measurements of wheel chord dimensions representing measured wheel features, such as a distance from leading rim edge ($LR_n$) to trailing rim edge ($TR_n$) or from leading tire edge ($LT_n$) to trailing tire edge ($TT_n$), along the four elevations $C_1$-$C_4$. These measurements are based on the identified points in time at which each laser intersects the rim edges of the wheel WR, and the velocity of the vehicle V. The vehicle velocity, if not already known from an independent sensor system, can be calculated by comparing the time at which the rim edge of the wheel WR is initially intersected by each laterally adjacent laser at a common vertical elevation. With the lateral spacing between each adjacent laser known from the configuration of the sensor assembly or unit 150, the velocity Vx of the vehicle V can be calculated according to:

$$Vx = \frac{\text{(laser lateral spacing)}}{(\Delta T)} \quad \text{Eqn. 1}$$

where $\Delta T$ is the elapsed time between rim intersections ($LR_n$, $TR_n$) for laterally adjacent lasers at the common vertical elevation. Multiple measures of vehicle velocity Vx obtained from the various pairs of laterally spaced laser emitters 204 in a sensor assembly or unit 150 may be averaged to obtain a best estimate of the vehicle velocity Vx. Using the vehicle velocity Vx, the dimension of each chord across the wheel assembly feature, such as the rim, traversed by individual laser spots can be calculated according to:

$$\text{Chord Length} = Vx \times \Delta T_L \quad \text{Eqn. 2}$$

where $\Delta T_L$ is the elapsed time between a single laser beam intersecting the feature leading and trailing edges (i.e., the beginning and ending points of the chord being measured). Averaging and outlier data processing techniques can be applied to the acquired measurements of velocity, time, or chord lengths, to discard any which are determined to be outside of an acceptable tolerance. If the vehicle V is assumed to have four identical wheel assemblies W, a sensor assembly or unit 150 assumed to have 16 laser emitters, and the vehicle inspection lane 10 is configured with a second sensor assembly or unit 150 on the opposite side, as shown in FIG. 1, a total of 64 separate measurements of wheel rim chord dimensions ($LR_n$ to $TR_n$) will be captured (16 for each wheel W), enabling suitable averaging techniques to be applied. Substantially identical procedures can be utilized to establish a set of measurements corresponding to wheel assembly chord dimensions for tires WT, from a leading tire edge ($LT_n$) to a trailing tire edge ($TT_n$).

Figure 5:
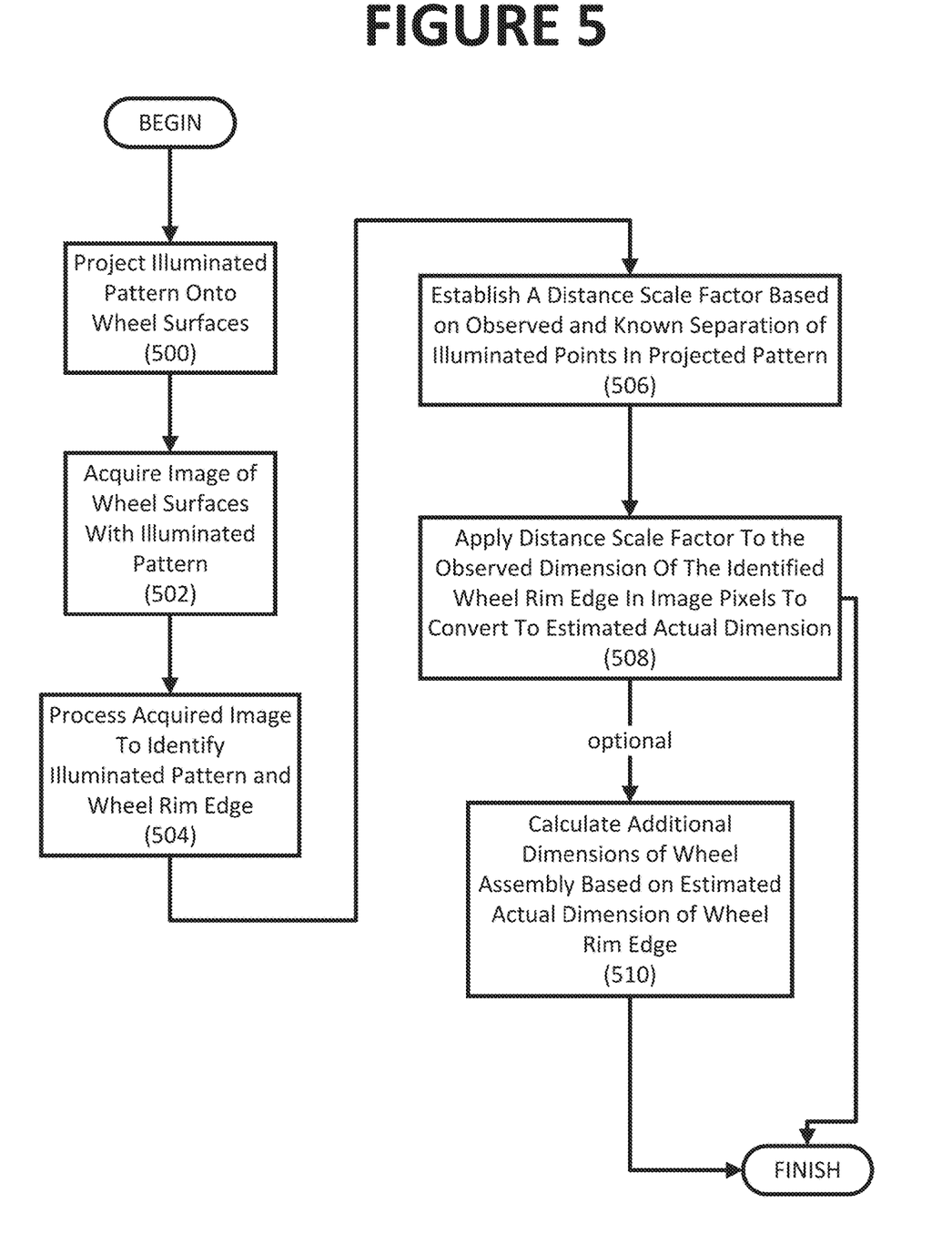
FIG. 5 is a flow chart illustrating the steps in an alternate procedure of the present disclosure for determining dimensions associated with an observed wheel assembly.

With reference to FIG. 5, once a set of wheel rim chord dimensions are identified, such as along $C_1$ ($LR_1$ to $TR_1$) and $C_4$ ($LR_4$ to $TR_4$), a diameter (2·R) for the wheel rim WR can be calculated using the observed length of the two vertically spaced wheel chords, the vertical displacement (d) between the chords, (known from the vertical spacing $h_1$ and $h_2$ of the corresponding laser emitters 204 in each displacement sensor system 200), and the vertical offset ($h_0$) of the lowest chord from the wheel center point (O).

$$C_1 = 2 * \sqrt{R^2 - (d - h_0)^2} \quad \text{Eqn. 3}$$

$$C_2 = 2 * \sqrt{R^2 - h_0^2} \quad \text{Eqn. 4}$$

Solving each of Eqn. 3 and Eqn. 4 for a value of R yields:

$$R = \sqrt{\left(\frac{C_1}{2}\right)^2 + (h_0 + d)^2} \quad \text{Eqn. 5}$$

and $$R = \sqrt{\left(\frac{C_2}{2}\right)^2 + h_0^2} \qquad \text{Eqn. 6}$$

solving for $h_0$ yields:

$$h_0 = \frac{\left(\frac{C_2}{2}\right)^2 - \left(\frac{C_1}{2}\right)^2 - d^2}{2d} \qquad \text{Eqn. 7}$$

The resulting value for $h_0$ is then substituted into Equation 6 to solve for R, yielding the wheel rim diameter of 2R:

$$\text{Diameter} = 2R = 2\sqrt{\left(\frac{C_2}{2}\right)^2 + \left(\frac{\left(\frac{C_2}{2}\right)^2 - \left(\frac{C_1}{2}\right)^2 - d^2}{2d}\right)^2} \qquad \text{Eqn. 8}$$

Using the system configured as noted above, 16 chord measurements per wheel W (four measures of each of four chords), has the potential to yield 96 combinations of chord pairs (24 per each wheel W), each of which can be utilized to determine a value for the wheel rim diameter 2R. The resulting determined values for wheel rim diameters can be statistically filtered and averaged to identify the most likely value for the diameter of each vehicle wheel rim WR on the observed vehicle V, from which related measurements, such as the wheel rim bead seat diameter, are determined using a known bead seat offset from the wheel rim diameter.

Substantially identical procedures can be utilized to establish a set of chord measurements from which a value for the overall diameter of the wheel W (at the outer circumference of the tire WT) is identified. Subtracting the wheel rim diameter from the overall diameter of the wheel W will provide a measurement representative of the tire sidewall size. If the width of the tire contact patch is known, such from a drive-over tire tread depth measurement system installed in the vehicle inspection lane 10, an estimation or best-guess of the standardized size for the installed tire WT on the wheel W can be generated from the wheel rim radius R and aspect ratio of tire sidewall height and width. Standardized sizes for tires are expressed in the general form of "Axxx/yyBzz", where "A" represents the tire type, "xxx" is the width of the tire measured in millimeters from sidewall to sidewall (i.e., generally the width of the contact patch), where "yy" is the aspect ratio corresponding to the ratio of the height of the tire's cross-section (generally the sidewall height) to its width, "B" is the tire construction type, and "zz" represents the diameter of the wheel rim in inches. For example, a tire may be designated as:

P215/65R15

This tire would be understood to be a P-Metric tire conforming to US standards for passenger vehicles, with a 215 mm width, and an aspect ratio of 65, meaning that the tire sidewall size (height) is equal to 65% of the tire's width. The tire is of a radial construction (by the "R" designation), and intended for use on a 15" diameter wheel rim WR.

It is understood that tires are not manufactured in an infinite range of sizes, but rather, are limited to discrete sizes which vary in incremental units, such as by 5 mm widths. As such, the tire size calculated from the actual measurements may not correspond to a standardized tire size, due to variations introduced by the measurement process and tire wear. Accordingly, the measured tire size is compared to a table of standardized tire sizes to determine at least one best-guess as to the closest matching standardized tire size. Depending upon the level of certainty in the various measurements, a ranked set of standardized sizes is generated, optionally including an indication of the degree of certainty for each size.

In an alternate embodiment, illustrated generally in FIGS. 5-9, a photo-imaging sensor for acquiring an image of a vehicle wheel assembly (while moving or while stationary) is utilized in combination with displacement measurements, such as determined from a projection system capable of projecting an illuminated pattern having known or determinable dimensions onto a wheel assembly surface, to determine tire and wheel rim dimensions, and optionally vehicle ride height measurements. An image of the vehicle wheel assembly W, acquired while the vehicle is moving or stationary, by the photo-imaging sensor which includes the projected illuminated pattern, or which is associated with determined distances to the wheel assembly W, is evaluated to identify the edge of the wheel rim WR and an associated size of the wheel rim, using the known or determinable dimensions of the illuminated pattern (or the determined distances to the wheel assembly W).

In an exemplary configuration, a sensor assembly or unit 150 including at least one displacement sensor system 200, such as shown in FIG. 2, is further configured with a photo-imaging sensor to acquire one or more images of a vehicle wheel assembly. Following the basic procedure shown in FIG. 5, the displacement sensor system 200 is activated (Box 500) to project a pattern of laser points 208 onto the surfaces of a wheel assembly W as the vehicle V passes through the sensor region 50. Images, such as shown in FIG. 6, of the vehicle wheel assembly W are acquired (Box 502) by the photo-imaging sensor, and are processed (Box 504) by the displacement sensor system 200 to identify, and estimate a measure of, the vehicle wheel rim diameter.

Preferably, the photo-imaging sensor is disposed within the sensor assembly or unit 150, with an optical axis generally aligned parallel to, and in close proximity to, the projection axis of the individual laser emitters 204 in the displacement sensor system 200, such that the photo-imaging sensor acquires images of the surfaces onto which the laser spots 208 are projected (Box 502) without significant perspective distortion. Those of ordinary skill in the art will recognize that if the optical axis of the photo-imaging sensor is aligned at an angle relative to the projection axis of the laser emitters 204, scaling or correction for perspective distortion of the separation between adjacent laser spots 208 may be required to achieve a desired degree of measurement precision.

Figure 6:
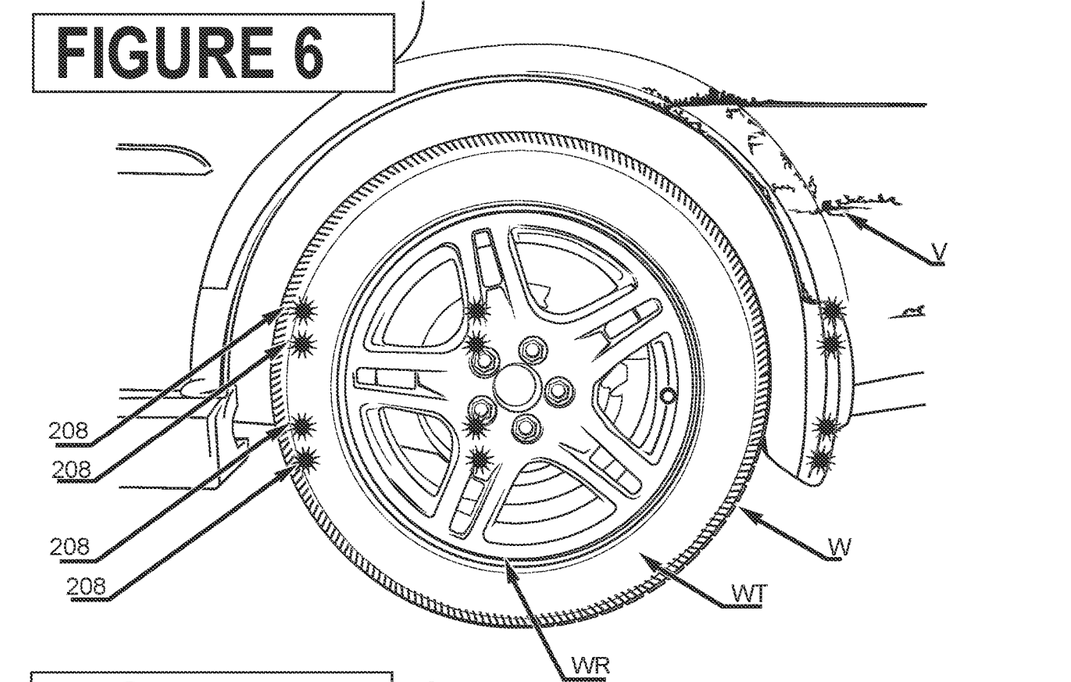
FIG. 6 is a photograph of a set of laser points projected onto the surfaces of a vehicle and vehicle wheel assembly.

As a vehicle V moves through the vehicle inspection lane 10 and into the sensor region 50, the photo-imaging sensor acquires at least one image of a passing vehicle wheel assembly W, such as shown in FIG. 6. If multiple images are acquired in a sequence, it is preferable to utilize the image in which the wheel assembly is most closely aligned orthogonal to the optical axis of the photo-imaging sensor in order to reduce the effects of perspective image distortion. As can be seen in FIG. 6, the illuminated laser spots 208 from the displacement sensor system 200 are visible in the acquired image, with at least two laser spots 208 visible on the sidewall surface of the tire WT in close proximity to the edge of the wheel rim WR.

Once a suitable image of a vehicle wheel assembly W is acquired, the image is processed (Box 504) by a suitably configured processing system to identify individual illuminated laser spots 208 visible on surfaces within the image, and the wheel rim circumferential edge RE. A variety of image processing techniques may be utilized to identify the wheel rim circumferential edge RE, including the use of threshold filtering, edge finding, and ellipse fitting (a perfectly circular wheel rim may appear elliptical in an acquired image due to perspective distortion). Using the known spatial relationships between illuminated laser spots 208, a conversion or scaling factor between actual separation distances of the laser spots 208 and a corresponding number of image pixels (image dimension) is established (Box 506). Applying the established conversion or scaling factor to the observed number of image pixels 202a (i.e., the image dimension) representing a major axis (designated as the diameter) of the identified wheel rim edge RE, yields an estimate (Box 508) of the actual wheel rim diameter dimension, from which other related measurements, may optionally be determined (Box 510). For example, a wheel rim bead seat diameter may be determined using a known bead seat offset distance from the wheel rim diameter.

Figure 7:
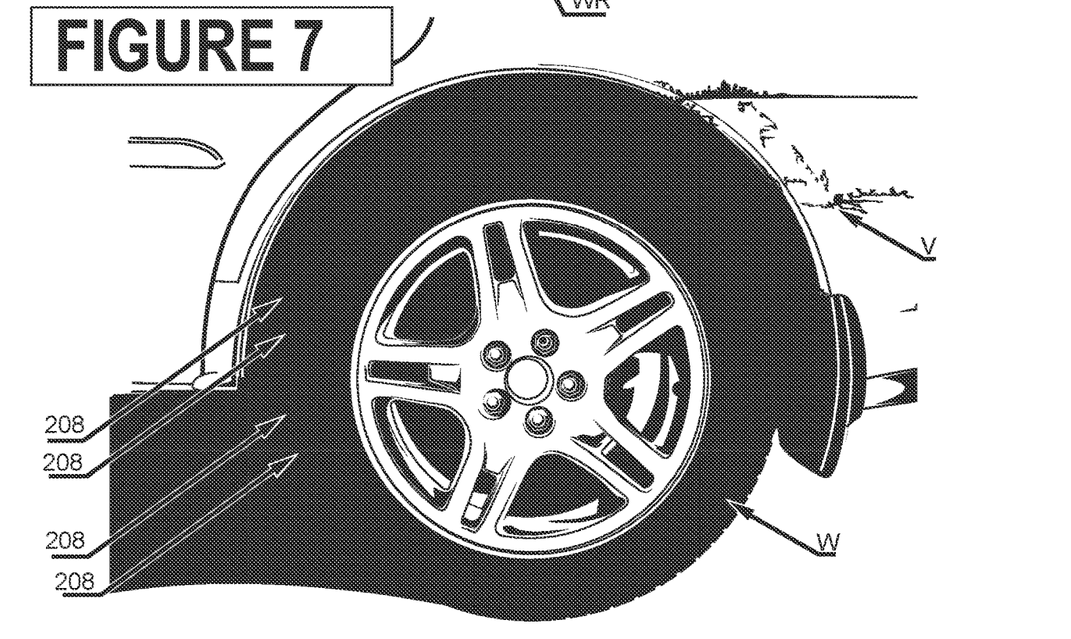
FIG. 7 is black and white threshold representation of the photograph in FIG. 6.
Figure 8:
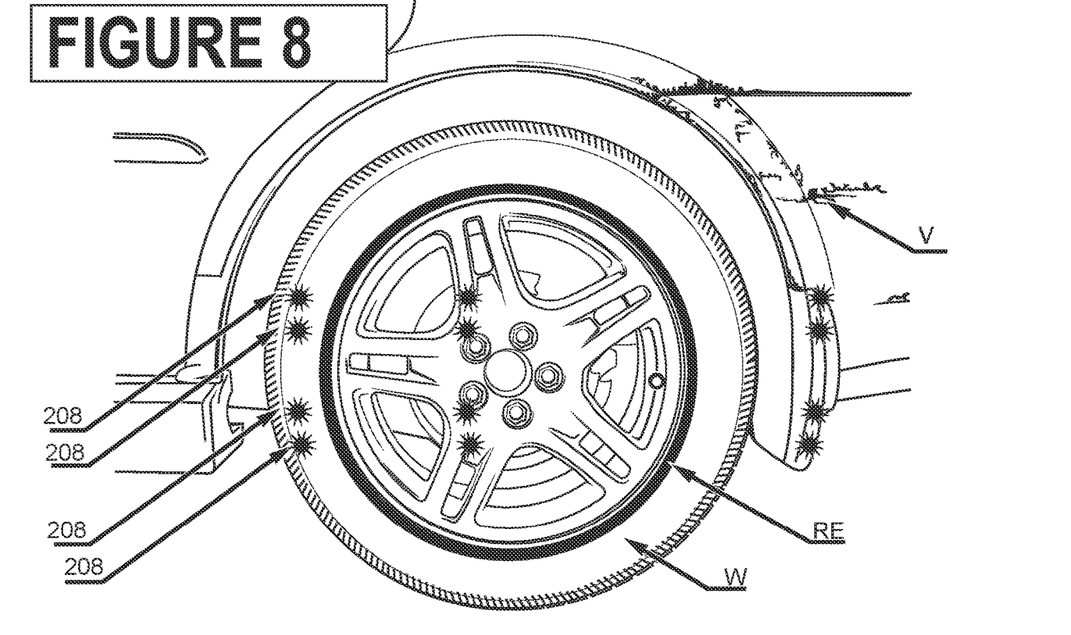
FIG. 8 illustrates a wheel rim edge identified in the photograph of FIG. 6 from the threshold representation shown in FIG. 7.
Figure 9:
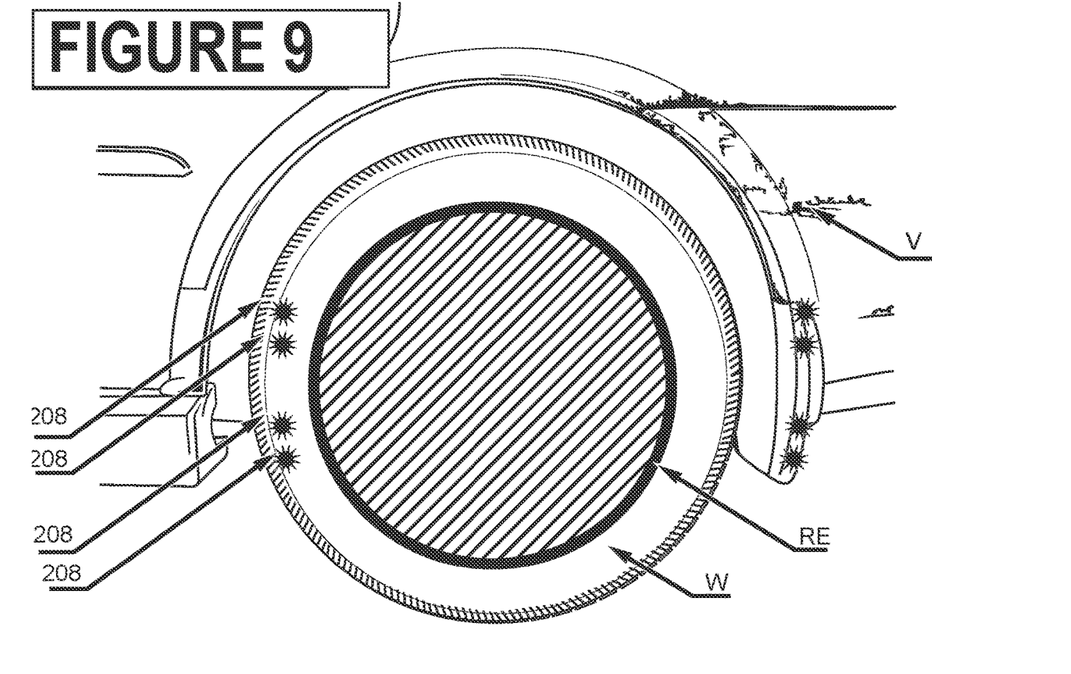
FIG. 9 is the photograph of FIG. 6, with a feature mask applied within the identified wheel rim edge of FIG. 8.

The procedures implemented by a processor associated with a sensor assembly or unit 150 configured with suitable instructions to determine a wheel rim diameter measurement from a received image are illustrated by the images shown in FIGS. 7-9. First, images of a vehicle wheel assembly, such as seen in FIG. 6 is processed to apply a threshold filter, effectively converting a color image into a black and white image, as shown in FIG. 7. Using suitable edge detection and contour detection filters, the threshold image is evaluated to identify visible edges. The processor next evaluates the identified edges within the image using an ellipse fitting algorithm to locate substantially circular contours or edges, such as the circumference of the wheel rim. The largest and most circular contour identified via the ellipse fitting algorithm is designated as the vehicle wheel rim edge, shown seen in FIG. 8, and the image dimension (in image pixels) of the major axis thereof is determined and stored by the processor.

Next, the processor is configured to mask the region of the image contained within the identified wheel rim edge, as seen in FIG. 9. Masking the wheel rim inner surfaces eliminates a region of irregular and potentially highly reflective surfaces (i.e., wheel spokes) from the image, simplifying subsequent image processing. The remaining portions of the image are evaluated to identify any visible illuminated laser spots 208, such as by first converting the image to a Hue-Saturation-Value (HSV) color space and detecting only those image pixels which exhibit color characteristics matching the color characteristics of the illuminating laser light. It will be recognized that a variety of other methods may be utilized to acquire and process images to identify illuminated laser light, such as, but not limited to, the use of monochrome images and optical filters. Features composed of image pixels detected with matching color characteristics are further evaluated based on size and color to identify the individual illuminated laser spots within the image and calculate precise locations of associated laser spot centroids (in image sub-pixel coordinates). The laser spot centroids are then sorted in vertical order, corresponding to the known vertical arrangement of the associated laser emitters 204 in the imaging displacement sensor system 200. Using the known spatial relationships between illuminated laser spots (from the known arrangement of associated laser emitters), a conversion or scaling factor from the corresponding image dimension (in image pixels) between the laser spot centroids is established. Applying the conversion factor to the measured image dimensions (in image pixels) of the identified major axis (diameter) of the wheel rim edge in the image yields a representation of the overall wheel rim diameter, such as in inches or millimeters, from which related measurements, such as the wheel rim bead seat diameter, may optionally be determined.

Once determined, a wheel rim diameter, or bead seat diameter, may be utilized by a vehicle inspection system to further identify the size of installed tires on the vehicle, or specific manufacturer installed options based on a correlation between wheel size and vehicle option packages.

While the present method and apparatus have been described as utilizing at least one pair of lasers to project illuminating points having known spatial separation onto the surfaces of a wheel rim and tire assembly, it will be recognized that any illuminated feature having at least one known dimension may be projected instead. For example, a projection of a line segment or other geometric shape having at least one known dimension which is invariant with the distance from the projection source may be utilized in place of the pair of illuminated points. Alternatively, an illuminated feature having at least one known dimension that varies is proportional to a distance from the projection system may be utilized if the distance between the projection system and the illuminated feature is known or determined at the time the image is acquired.

Figure 10:
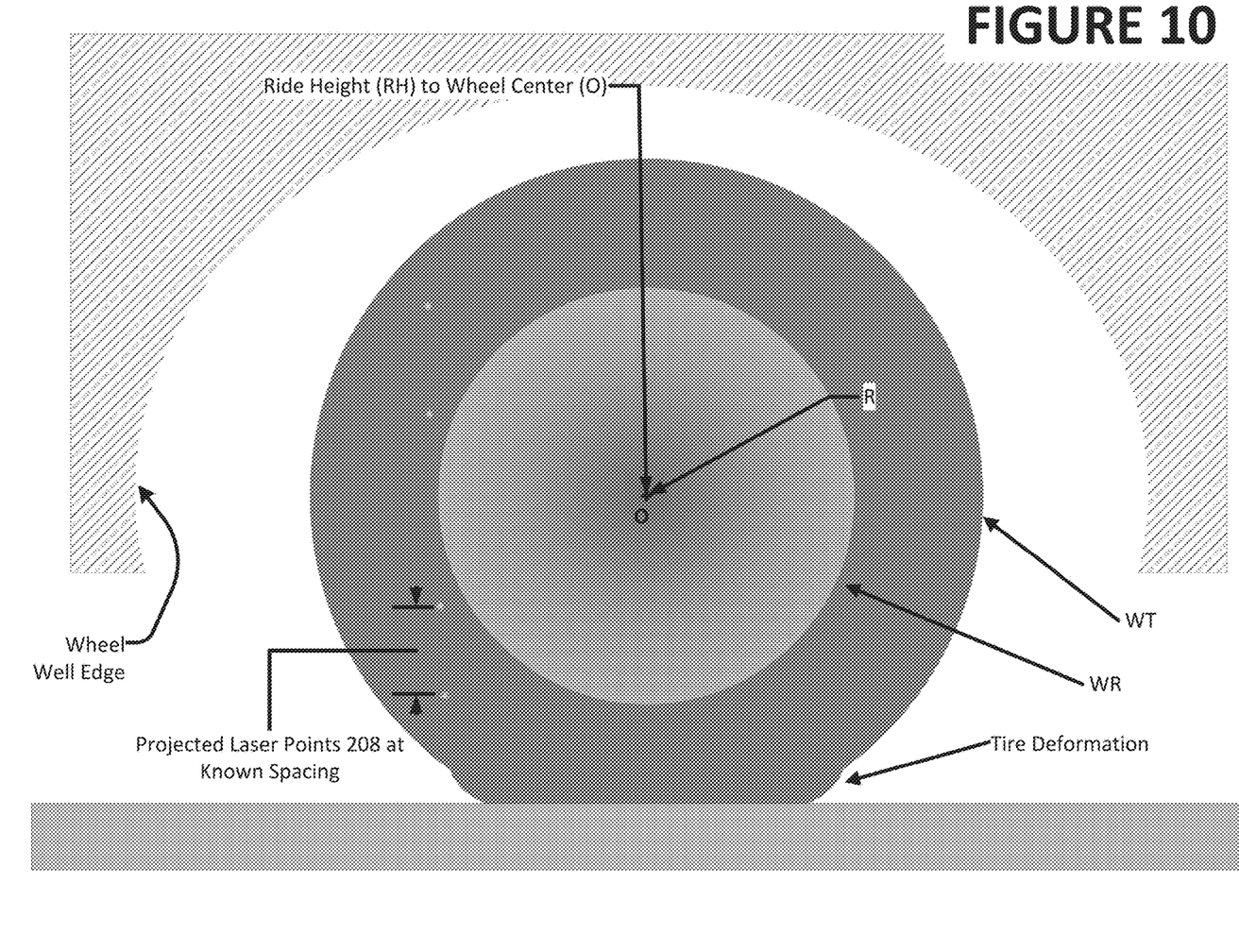
FIG. 10 is a representation of various measurements and relationships observed during a non-contact measurement of vehicle ride height.

In a further embodiment, illustrated generally in FIG. 10, a photo-imaging sensor for acquiring an image of a vehicle wheel assembly W (such as described above for measuring the wheel rim and tire dimensions) is configured to additionally capture portions of a surrounding vehicle wheel well in the wheel assembly image. The image data is utilized in combination with the displacement sensor system 200 capable of projecting an illuminated feature, such as laser spots 208, having known or determinable dimensions onto a vehicle body panel or wheel assembly surface, such as described previously. An image of the vehicle wheel assembly and wheel well, is acquired while the vehicle is moving or stationary, by the photo-imaging sensor. The image includes the projected illuminated feature, and is evaluated to identify a wheel well edge or lip, the known or determinable dimensions of the illuminated feature in the image, such as the image spacing of a pair of projected laser spots 208, and an associated vertical position of the uppermost point of the wheel well edge or lip using an edge-finding algorithm. Distances observed within the image are scaled into actual dimensions using the procedures described above. The associated vertical position of the point on the wheel well edge or lip may either be based on a scaled image distance established with reference to a known vertical elevation of the projected illuminated feature, such as a laser spot 208 projected parallel to the ground, or from a scaled image distance to a calculated center point O of the wheel rim, identified by further image processing. Those of ordinary skill in the field of vehicle wheel alignment and inspection will readily recognize that depending upon how ride height is defined, measurements of different distances with the acquired image of the vehicle wheel assembly W and wheel well may be required. For example, ride height may be defined as a distance to an uppermost point on a wheel well from the ground surface on which the vehicle wheel assembly W rests, or a distance between the wheel well uppermost point and a particular point on a peripheral edge of the tire WT or wheel rim WR. It will be noted that measurements to ground or to points on a tire circumference can be distorted by deformation of the tire contact patch region under load, and may not be ideal dimensions to utilize.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A non-contact vehicle inspection system, comprising:
at least two vertically spaced light sources laterally adjacent to a vehicle inspection lane, each light source configured to illuminate an associated axis into said inspection lane at a known vertical elevation;
a means for measuring the velocity of a vehicle moving through said inspection lane generally orthogonal to said associated axes;
at least one imaging sensor having a field of view oriented towards said vehicle inspection lane, said at least one imaging sensor configured to receive reflections of said illumination from wheel assembly surfaces on said moving vehicle;
a processing system configured to evaluate optical characteristics of said received reflections to identify points in time when said illumination traverses, due to said vehicle movement, across a boundary between a tire sidewall surface and a wheel rim; and
wherein said processing system is further configured to receive a measure of vehicle velocity from said measuring means for utilization together with said identified points in time, and said associated known vertical elevations, to determine a diameter of said wheel rim;
wherein said processing system is further configured to identify for at least two known vertical elevations, a corresponding chord length across said wheel rim from said identified points in time and said received measure of vehicle velocity; and
wherein said processing system is further configured to determine said diameter of said wheel rim according to $$\text{Diameter} = 2\sqrt{\left(\frac{C_2}{2}\right)^2 + \left(\frac{\left(\frac{C_2}{2}\right)^2 - \left(\frac{C_1}{2}\right)^2 - d^2}{2d}\right)^2}$$

where $c_1$ and $c_2$ are said two identified chord lengths, and wherein d is a vertical separation distance between said two chords.

2. A method for measuring a rim dimension of a wheel rim and tire assembly mounted on a moving vehicle passing through an inspection region, comprising:
projecting an illuminated pattern having at least one known fixed dimension onto a surface of a wheel rim and tire assembly passing through said inspection region;
acquiring, with an imaging sensor, a two dimensional image of a portion of said inspection region containing both the projected illuminated pattern and said wheel rim and tire assembly;
identifying, within said acquired two dimensional image, an elliptical edge feature corresponding to a circumferential edge of said wheel rim;
determining an image dimension for at least one axis of an ellipse fitting to said elliptical edge feature;
identifying, within said acquired two dimensional image, said projected illuminated pattern on said surface of said wheel rim and tire assembly;
determining an image dimension of said known fixed dimension of said projected illuminated pattern;
establishing a conversion factor between said known fixed dimension and said determined image dimension of said projected illuminated pattern; and
determining an actual dimension of said at least one axis of said ellipse, said ellipse corresponding to said edge of said wheel rim, from said established conversion factor and said determined image dimension of said at least one axis.

3. The method of claim 2 wherein said at least one known fixed dimension of said projected illuminated pattern is invariant with respect to a distance from a projection source.

4. The method of claim 2 wherein said projected illuminated pattern includes at least two points of illumination projected along parallel axes, and wherein said at least one known fixed dimension is a separation distance between said parallel axes.

5. A non-contact vehicle inspection system, comprising:
an optical imaging system having a field of view oriented to acquire an image of a wheel assembly consisting of a wheel rim and tire mounted on a vehicle;
a projection system having at least one source of illumination configured to project an illuminated pattern onto a wheel assembly surface within said imaging system field of view;
a processing system configured to receive at least one two dimensional image from said optical imaging system, said processing system having operating instructions to fit an ellipse to an elliptical wheel feature identified within said received image corresponding to a circumferential edge of said wheel rim, and to identify said illuminated pattern on said wheel assembly surface;
wherein said processing system is further configured with operating instructions to establish a conversion factor between said at least one known dimension of said illuminated pattern and an image dimension within said at least one two dimensional image; and
wherein said processing system is further configured with operating instructions to apply said established conversion factor to an image dimension of said identified elliptical wheel feature to establish a measure at least one of a diameter or a radius of said wheel rim.

6. The non-contact vehicle inspection system of claim 5 wherein said illuminated pattern includes at least one known dimension which is invariant with respect to a distance from said projection system.

7. The non-contact vehicle inspection system of claim 5 wherein said projection system is configured with a pair of laser emitters, said pair of laser emitters configured to project a pair of illuminating beams along parallel axes having a known spatial separation.

8. The method of claim 2 wherein identifying said elliptical edge feature includes applying an edge detection filter said two dimensional image and evaluating an output from said edge detection filter with an ellipse fitting algorithm.

9. The method of claim 8 wherein identifying within said acquired two dimensional image, said projected illuminated pattern includes excluding a portion of said two dimensional image from further processing by masking a portion of said acquired two dimensional image contained within said ellipse.

10. The method of claim 2 wherein determining an actual dimension of said at least one axis of said ellipse determines an actual dimension of a major axis of said ellipse.

* * * * *